(12) United States Patent
Kumada et al.

(10) Patent No.: US 6,681,630 B1
(45) Date of Patent: Jan. 27, 2004

(54) VIBRATING GYROSCOPE

(75) Inventors: Akira Kumada, Otsu (JP); Hiroyuki Hirano, Shiga-ken (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 231 days.

(21) Appl. No.: 09/664,947

(22) Filed: Sep. 19, 2000

(30) Foreign Application Priority Data

Sep. 20, 1999 (JP) .......................................... 11-265822

(51) Int. Cl.⁷ ................................................. G01P 9/00
(52) U.S. Cl. ................................................. 73/504.12
(58) Field of Search ......................... 73/504.02, 504.04, 73/504.12, 504.13, 504.14, 504.15, 504.16; 310/316.01, 319, 329

(56) References Cited

U.S. PATENT DOCUMENTS

| | | | |
|---|---|---|---|
| 4,791,815 A | * 12/1988 | Yamaguchi et al. | ..... 73/504.16 |
| 5,016,072 A | * 5/1991 | Greiff | ............................ 73/505 |
| 5,126,812 A | 6/1992 | Greiff | ........................... 357/25 |
| 5,347,867 A | 9/1994 | Pangerl | ..................... 73/517 R |
| 5,473,288 A | * 12/1995 | Kumada | ................... 73/504.12 |
| 5,719,460 A | * 2/1998 | Watarai et al. | ............... 310/316 |
| 6,134,952 A | * 10/2000 | Garver et al. | ............. 73/504.16 |

FOREIGN PATENT DOCUMENTS

| | | |
|---|---|---|
| DE | 69210679 T2 | 9/1996 |
| DE | 69126381 T2 | 9/1997 |
| DE | 69410973 T2 | 2/1999 |
| JP | 2-099829 A | 4/1990 |
| JP | 6-111175 A | 4/1994 |
| JP | 8-210860 A | 8/1996 |

* cited by examiner

*Primary Examiner*—Helen Kwok
(74) *Attorney, Agent, or Firm*—Keating & Bennett, LLP

(57) ABSTRACT

A vibrating gyroscope includes a vibrator having a plurality of detecting elements and a driving element; a plurality of amplifiers for amplifying detection signals from the respective detecting elements; a plurality of wirings respectively connected between the plurality of detecting elements and the plurality of amplifiers and shielded with an electric potential based on an output of the amplifiers.

5 Claims, 2 Drawing Sheets

VIBRATING GYROSCOPE

BACKGROUND OF THE INVENTION

1. Field of the Invention

The present invention relates to a vibrating gyroscope and more particularly to a piezoelectric vibrating gyroscope.

2. Description of the Related Art

As a piezoelectric vibrating gyroscope, generally there is a type where the vibrator is composed of a vibrating reed and a type where the vibrator is composed of a tuning fork. Further, among vibrators to be used in piezoelectric vibrating gyroscopes, there are a type where the vibrator itself is made of a piezoelectric ceramic material and electrode films constituting a detecting element and a drive element are formed thereon and a type where the vibrator is made of a member material producing mechanical vibration such as an elastic metal and piezoelectric elements constituting a detecting element and a drive element are formed thereon.

In these vibrating gyroscopes, a bending displacement of a vibrator due to a Coriolis force generated at the time when a rotational angular velocity is applied to the vibrator is changed into an electrical signal by using a piezoelectric material and an electrical output in proportion to the rotational angular velocity is obtained through a detecting circuit.

A conventional example of a signal processing circuit to process detection signals output from a vibrator in these vibrating gyroscopes is explained with reference to FIG. 3.

In FIG. 3, reference numeral 1 represents a vibrator. The vibrator 1 is provided with a vibrating body 2, two detecting elements 3a and 3b and a driving element 3c. The two detecting element 3a and 3b are connected to the input stages of buffer amplifiers 4a and 4b through wirings 7a and 7b, respectively. Further, the wirings 7a and 7b are connected to a reference voltage $V_{ref}$ through load resistors $R_L$, respectively. The output from the buffer amplifier 4a is input to an adder 5 and a differential circuit 6, and in the same way the output from the buffer amplifier 4b is input to the adder 5 and the differential circuit 6. Then, the output signal from the adder 5 is fed back to a drive circuit 11, and the output signal as an angular velocity detection signal from the differential circuit 6 is output to a next stage constituting a circuit for treatment of the detection signal.

The above-explained conventional vibrating gyroscope has the following problems.

That is, in the circuit for processing the detection signal in the conventional vibrating gyroscope, parasitic capacitances $C_{sa}$ and $C_{sb}$ are generated between the wirings 7a and 7b connected to the vibrator 1 and a ground (or a reference voltage), respectively.

Although these parasitic capacitances $C_{sa}$ and $C_{sb}$ had little adverse effect when the vibrator 1 was of a large size and the electrical signal obtained by piezoelectric effect was large, with miniaturization of the vibrator 1 in recent years the capacitance of piezoelectric elements as a detecting element was reduced and the effect of the above parasitic capacitances became not negligible, and this caused variations in level and phase of the output signals from the two detecting element 3a and 3b.

It is possible to suppress these variations by making the parasitic capacitances $C_{sa}$ and $C_{sb}$ equal, but in order to equalize them it is required that the wirings 7a and 7b. connecting the two detecting element 3a and 3b and the buffer amplifiers 4a and 4b be formed so as to have the same length and width and to be symmetric with each other.

However, in order to form wirings meeting the above conditions, many new restrictions were put on the design of wirings and these restrictions became main causes to hinder miniaturization of the circuit board.

Further, when the circuit board where a circuit pattern meeting the above conditions is formed is put into a vibrating gyroscope unit, new parasitic capacitances (affecting the circuit) generated between the circuit pattern and other elements such as the case of the unit excluding the circuit affected the circuit.

Further, when the operating conditions (temperature, humidity, etc.) of the vibrating gyroscope unit were changed, the parasitic capacitances were altered causing variations in level and phase of the output signals from the vibrator.

SUMMARY OF THE INVENTION

Therefore, it is an object of the present invention to provide a vibrating gyroscope where the above-mentioned problems are solved, where the occurrence of problems due to the parasitic capacitance and variations of the parasitic capacitance is suppressed, and where stabilization of the output signals are made possible.

The present invention reduces the variations of characteristics of a vibrating gyroscope by applying a circuit technique of a driven shield to the circuit construction and by suppressing the generation itself of parasitic capacitance.

The vibrating gyroscope comprises: a vibrator having a plurality of detecting elements and a driving element; a plurality of amplifiers for amplifying detection signals from the respective detecting elements; a plurality of wirings respectively connected between the plurality of detecting elements and the plurality of amplifiers and shielded with an electric potential based on an output of the amplifiers.

According to the present invention, even if there is a difference in wiring between a plurality of connecting means, the parasitic capacitances at the input stages of the amplifiers become zero. Therefore, various problems due to the parasitic capacitances can be solved.

For example, in designing circuits, the patterning of the circuits and the constructional design in consideration of generation of differences in parasitic capacitances become unnecessary and accordingly the freedom of designing is increased and miniaturization of the vibrating gyroscope becomes possible.

Even if environments change, the differences in parasitic capacitances are not altered, and accordingly the change of output signals of a vibrator is caused only by the change of the proper characteristics of the vibrator. Therefore, the effect of the environments on the output signal from a vibrating gyroscope is reduced, and because the change of the output signal is due to the proper characteristics of the vibrator, the correction in other circuits becomes easy and a more stable and more reliable output signal from the vibrating gyroscope can be obtained.

In addition, the output from the adding means is made nearly the same in amplitude as each of the plurality of output means, and accordingly it becomes possible to protect the connecting means from parasitic capacitances by a driven shield using the output signal of the adding means. This makes using an output from each of the amplifiers unnecessary. Because of this, when the circuit is made an IC, the number of pins can be reduced and further, because the circuit pattern of each of the driven shields is at the same potential, the freedom in designing the circuit patterns is increased, the vibrating gyroscope is more reduced in size and the cost of designing the vibrating gyroscope is decreased.

For the purpose of illustrating the invention, there is shown in the drawings several forms which are presently preferred, it being understood, however, that the invention is not limited to the precise arrangements and instrumentalities shown.

Other features and advantages of the present invention will become apparent from the following description of the invention which refers to the accompanying drawings.

DETAILED DESCRIPTION OF EMBODIMENTS OF THE INVENTION

Figure 1:
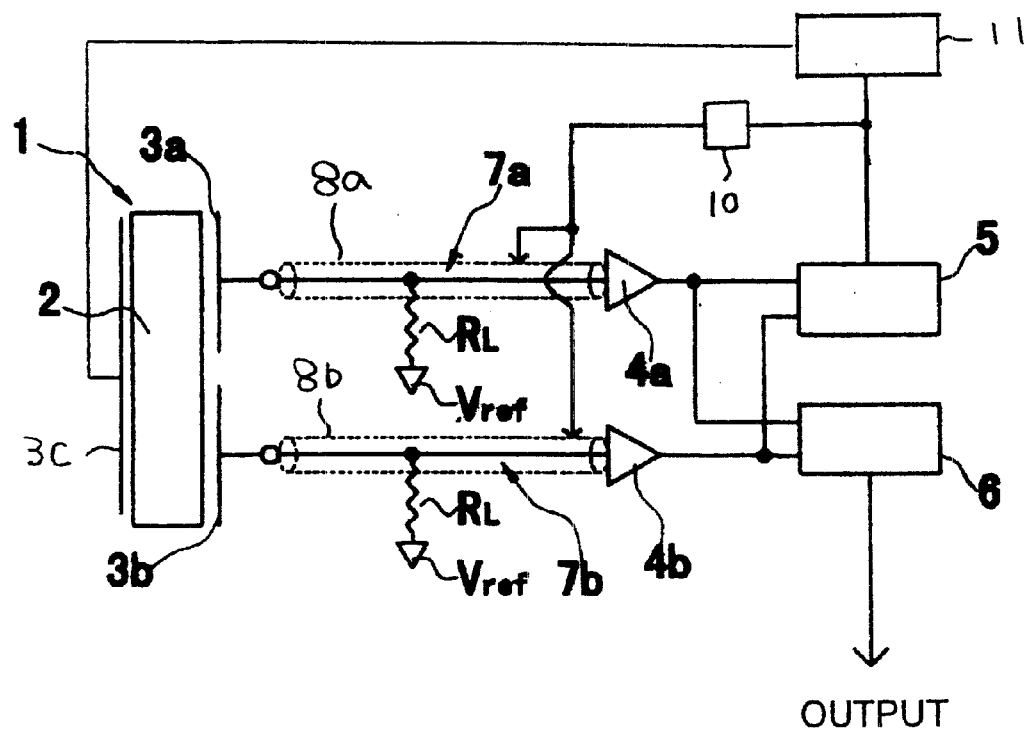
FIG. 1 illustrates a circuit construction of a vibrating gyroscope according to a first embodiment of the present.

Hereinafter, the embodiments of the present invention will be described in detail with reference to the accompanying drawings. The same constructional element as in the conventional example is given the same reference numeral.

Referring to FIG. 1 the vibrating gyroscope according to a first embodiment includes a vibrator 1. The vibrator 1 is provided with a vibrating body 2, two detecting element 3a and 3b and a driving element 3c.

The driving element 3c is connected to a drive circuit 11, and the vibrating body 2 vibrates by a driving signal from the driving element 3c.

As described hereinbefore, the vibrator 1 may be of a vibrating-reed type or of a tuning-fork type, and the material of the vibrating body 2 may be any material generating mechanical vibration such as a permanent elastic metal material of elinvar, etc. and a piezoelectric ceramic material containing lead titanate, etc. as its main components. Here, when the vibrating body 2 is composed of a metal material, plate-like piezoelectric elements polarized in the thickness direction are used for the detecting element 3a and 3b, and when the vibrating body 2 is composed of a piezoelectric ceramic material, electrodes are used for the detecting element 3a and 3b.

The two detecting element 3a and 3b are connected to the input stages of buffer amplifiers 4a and 4b through wirings 7a and 7b, respectively. Further, the wirings 7a and 7b are connected to a reference voltage $V_{ref}$ through load resistors $R_L$. The output from the buffer amplifier 4a is input into an adder 5 as an adding means and a differential circuit 6, and in the same way the output from the buffer amplifier 4b is input into the adder 5 and the differential circuit 6. Then, the output signal from the adder 5 is fed back to the drive circuit 11, and the output signal from the differential circuit 6 as an angular velocity detection signal is output to a next stage of a circuit for treatment of the detection signal (not illustrated).

In the circuit construction, a circuit technique of driven shield has been used to prevent parasitic capacitances generated between the wirings 7a and 7b connected to the vibrator 1 and the reference voltage. This is explained in the following.

The technique of driven shield is to be employed as a guard electrode in order to improve the input stability of amplifiers such as an operational amplifier having a high input impedance. This technique prevents parasitic capacitance and leak current from being generated between the input portion of an amplifier and the reference voltage in its vicinity.

As shown in FIG. 1, in the circuit construction of a vibrating gyroscope of the present invention, the output from the adder 5 where the signals from the two detecting element 3a and 3b are added is used as a drive signal source of driven shield. The adder 5 not only adds the output signals from the two detecting element 3a and 3b, but also outputs the added signal having nearly the same amplitude as the output signal output from each of the two detecting element 3a and 3b because the adder 5 has an amplification factor of ½.

The wirings 7a and 7b are provided with shields 8a and 8b such that the shields 8a and 8b surround the wiring 7a and 7b, respectively. The wirings 7a and 7b and the shields 8a and 8b may be co-axial cables in which central conductors as the wirings 7a and 7b are co-axially surrounded by outer conductors as the shield 8a and 8b, respectively. Alternatively, first conductive wiring patterns as the wirings 7a and 7b are provided on a circuit board and second conductive wiring patterns as the shield 8a and 8b may be disposed on the circuit board so as to be surrounded by the other conductive wiring patterns. In the case, the second conductive wiring patterns worked as the shield 8a and 8b may be provided on the same circuit board on the circuit board and/or stacked so as to interpose the first conductive wiring pattern by using a multilayer technique.

The shields 8a and 8b are connected to the output from the adder 5 via an impedance converter 10. The impedance converter 10 has a high input impedance and a low output impedance; an operational amplifier is one of the well-known devices to work as an impedance converter.

According to the above-explained structure, shields 8a and 8b are biased or driven with an electric potential which is the same as the electric potential of the detection signals transmitted via the wirings 7a and 7b. As a result, the surrounding of the wirings 7a and 7b are kept at an electric potential which is the same as the detection signals transmitted via the wirings 7a and 7b, thereby preventing a parasitic capacitances from being produced.

Next, a vibrating gyroscope according to a second embodiment of the present invention is explained with reference to FIG. 2. The same constructional element as in the circuit construction of a vibrating gyroscope according to a first embodiment shown in FIG. 1 is given the same reference numeral, and its explanation is omitted.

Figure 2:
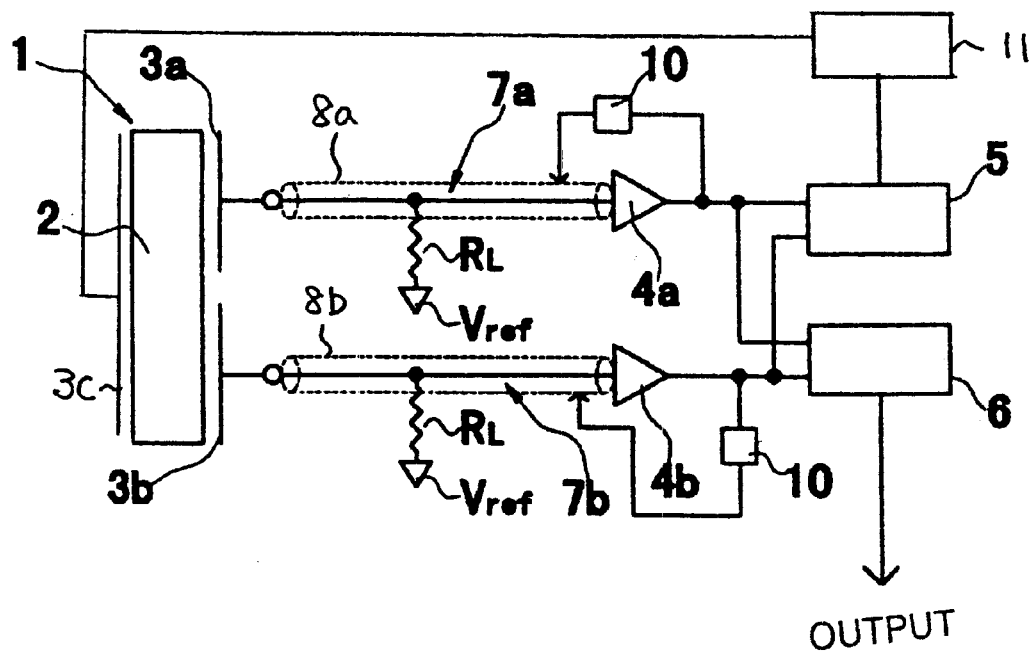
FIG. 2 illustrates a circuit construction of a vibrating gyroscope according to a second embodiment of the present.
Figure 3:
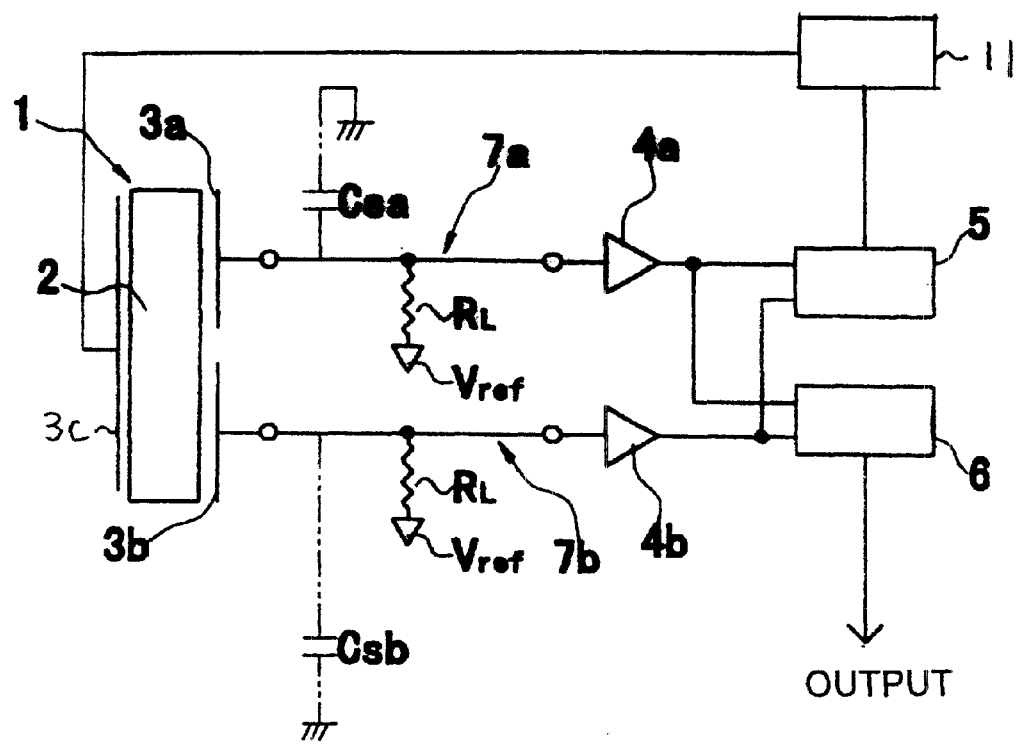
FIG. 3 illustrates a circuit construction of a conventional vibrating gyroscope.

In the circuit shown in FIG. 2, each of the output stages of buffer amplifiers 4a and 4b becomes a drive source for driven shield, and the shields 8a and 8b are connected to the output of the buffer amplifiers 4a and 4b via the impedance converters 10, respectively.

Under such a construction, when compared with the case of the first embodiment, the circuit becomes more complicated because the drive sources are increased to two, but the parasitic capacitance is suppressed as in the first embodiment.

Furthermore, a vibrating gyroscope according to the present invention is not limited to the above embodiments, and, for example, the circuit construction of the driven shields 10 is not limited to the construction shown in the above embodiments.

Further, in a vibrating gyroscope for detecting multiaxial angular velocities where two or more detecting element are provided, driven shields in accordance with a plurality of detecting element are constructed, and in particular when the output of the adder is made, the drive sources of the driven shields the amplification factor of the adder may be 1/(number of signals to be added by the adder).

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A vibrating gyroscope comprising:
   a vibrator having a plurality of detecting elements and a driving element;
   a plurality of amplifiers for amplifying detection signals from the respective detecting elements; and
   a plurality of wirings respectively connected between the plurality of detecting elements and the plurality of amplifiers, wherein the plurality of wirings have respective shields surrounding the wirings, each of the shields being connected to an electric potential based on an output of the amplifiers.

2. A vibrating gyroscope according to claim 1, wherein the vibrator is a piezoelectric vibrator.

3. A vibrating gyroscope comprising:
   a vibrator having a plurality of detecting elements and a driving element;
   a plurality of amplifiers for amplifying detection signals from the respective detecting elements;
   a plurality of wirings respectively connected between the plurality of detecting elements and the plurality of amplifiers; and
   an adder for summing outputs from the plurality of amplifiers, wherein the plurality of wirings have respective shields surrounding the wirings, each of the shields being connected to an electric potential based on an output of the adder.

4. A vibrating gyroscope according to claim 3, wherein the vibrator is a piezoelectric vibrator.

5. A vibrating gyroscope according to claim 3, wherein the adder amplifies the puts by an amplification factor of 1/number of added outputs.

* * * * *